United States Patent
Brehob

(10) Patent No.: US 6,718,755 B2
(45) Date of Patent: Apr. 13, 2004

(54) METHOD TO INCREASE TEMPERATURE IN AN EXHAUST AFTERTREATMENT DEVICE COUPLED TO A CAMLESS ENGINE

(75) Inventor: Diana D. Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 09/682,956

(22) Filed: Nov. 2, 2001

(65) Prior Publication Data

US 2003/0084661 A1 May 8, 2003

(51) Int. Cl.⁷ .................................................. F01N 3/00
(52) U.S. Cl. ............................. 60/284; 60/274; 60/285
(58) Field of Search ........................ 60/274, 284, 285, 60/299, 300, 303; 123/90.15

(56) References Cited

U.S. PATENT DOCUMENTS

| | | | |
|---|---|---|---|
| 3,861,143 A | * | 1/1975 | Morgan et al. ................ 60/277 |
| 4,827,888 A | * | 5/1989 | Vaznaian et al. ........... 123/531 |
| 5,293,741 A | | 3/1994 | Kashiyama et al. |
| 5,398,502 A | | 3/1995 | Watanabe |
| 5,410,872 A | | 5/1995 | Adamczyk, Jr. et al. |
| 5,850,811 A | | 12/1998 | Tomisawa et al. |
| 5,930,992 A | * | 8/1999 | Esch et al. ..................... 60/274 |
| 6,044,643 A | | 4/2000 | Ittner et al. |
| 6,519,933 B2 | * | 2/2003 | Ogiso et al. .................. 60/285 |

* cited by examiner

Primary Examiner—Thomas Denion
Assistant Examiner—Diem Tran

(57) ABSTRACT

A system and method are disclosed for operating an internal combustion to provide a temperature rise in an exhaust aftertreatment device. An exhaust valve is actuated during a compression stroke to release unburned fuel and air. The fuel oxidizes with the air in the exhaust aftertreatment device causing an exotherm. The opening and closing time of the exhaust valve are determined to cause the desired amount of fuel and air to be released into the exhaust aftertreatment device.

17 Claims, 3 Drawing Sheets

METHOD TO INCREASE TEMPERATURE IN AN EXHAUST AFTERTREATMENT DEVICE COUPLED TO A CAMLESS ENGINE

BACKGROUND OF THE INVENTION

1. Field of the Invention

The invention relates to a system and method to operate an internal combustion engine to provide unburned fuel and air into the exhaust aftertreatment device to improve the conversion efficiency of the exhaust aftertreatment device.

2. Background of the Invention

A factor in achieving low exhaust emissions from internal combustion engines, at the current state of the art, is to bring the exhaust aftertreatment device to its operating temperature as rapidly as possible after initiating engine operation. It has long been recognized that by introducing some unburned fuel and air into the exhaust duct of the engine at a location upstream of the exhaust aftertreatment device that the fuel and air react in the exhaust aftertreatment device creating an exotherm, thereby quickly raising the temperature of the exhaust aftertreatment device.

A common method to provide fuel and air to the exhaust aftertreatment device is described in U.S. Pat. No. 5,410,872, which is assigned to the assignee of the present invention. The air and fuel delivered to the combustion chamber of the engine is rich, i.e., contains excess fuel. Consequently, the engine exhaust contains unburned and partially burned fuel. Secondary air is introduced into the exhaust duct by an air pump. The incompletely burned fuel and secondary air mix and are introduced into the exhaust aftertreatment device in which oxidation occurs, creating an exotherm.

A problem with prior art approaches is in metering the fuel, primary air, and secondary air to provide the desired mixture and flow rates to the combustion chamber and to the exhaust aftertreatment device. The constraints are: providing a stoichiometric mixture (air to fuel ratio such that if reacted to completion, fuel and oxygen are completely consumed) to the exhaust aftertreatment device, providing sufficient unburned mixture to the exhaust aftertreatment device to provide the desired temperature rise in the exhaust aftertreatment device, and providing a rich, but combustible mixture, to the combustion chamber. This combination of constraints presents a complicated control task.

Another difficulty with prior art is the hardware required to accomplish the task: air pump, air lines, switches, metering devices, and others, which add weight, cost, additional plumbing, etc.

The inventor of the present invention has recognized a method to provide unburned fuel and air to the exhaust aftertreatment device overcoming metering problems and relying on existing hardware.

SUMMARY OF INVENTION

The above disadvantages are overcome by a method for operating a multi-cylinder internal combustion engine by providing an amount of air and fuel to a cylinder of the engine. The air and fuel are compressed. During compression, an exhaust valve of the cylinder is opened releasing a portion of the air and fuel into the exhaust aftertreatment device. In this way, the temperature of the exhaust aftertreatment device is increased.

Preferably, a system is disclosed for providing fuel and air to an exhaust aftertreatment device of a reciprocating multi-cylinder internal combustion engine which includes an exhaust valve coupled to a cylinder of the engine, capable of being actuated during a compression stroke of the engine, and an engine controller connected to the engine and the exhaust valve to actuate the exhaust valve during the compression stroke to release a portion of the contents of the cylinder into the exhaust aftertreatment device.

An advantage of the present invention utilized with an engine having exhaust valves that can be opened during the compression stroke, is that fuel and air from the combustion chamber can be released into the exhaust system without a separate air pump, additional plumbing, and valves of prior art approaches.

An advantage of the present invention is that the fuel and air are metered by existing hardware and well known strategies. That is, no control strategy need be developed to meter the fuel, primary air, and secondary air, as is the case in prior art. Specifically in the present invention, the air-fuel ratio may be controlled open loop based on a measure of airflow to the engine and controlling fuel pulse width or closed loop based on a signal from an exhaust gas oxygen sensor according to the present invention.

A further advantage of the present invention is that the air and fuel delivered to the combustion chamber may be in stoichiometric proportion thereby overcoming the potential of a rich misfire in the combustion chamber as may occur in the prior art.

Another advantage is that the present invention may be used in a diesel engine, or other engine with low exhaust temperatures such as homogeneous charge compression ignition engines, to maintain a high enough exhaust temperature in an exhaust aftertreatment device for high conversion efficiency.

The above advantages and other advantages, objects, and features of the present invention will be readily apparent from the following detailed description of the preferred embodiments when taken in connection with the accompanying drawings.

BRIEF DESCRIPTION OF DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
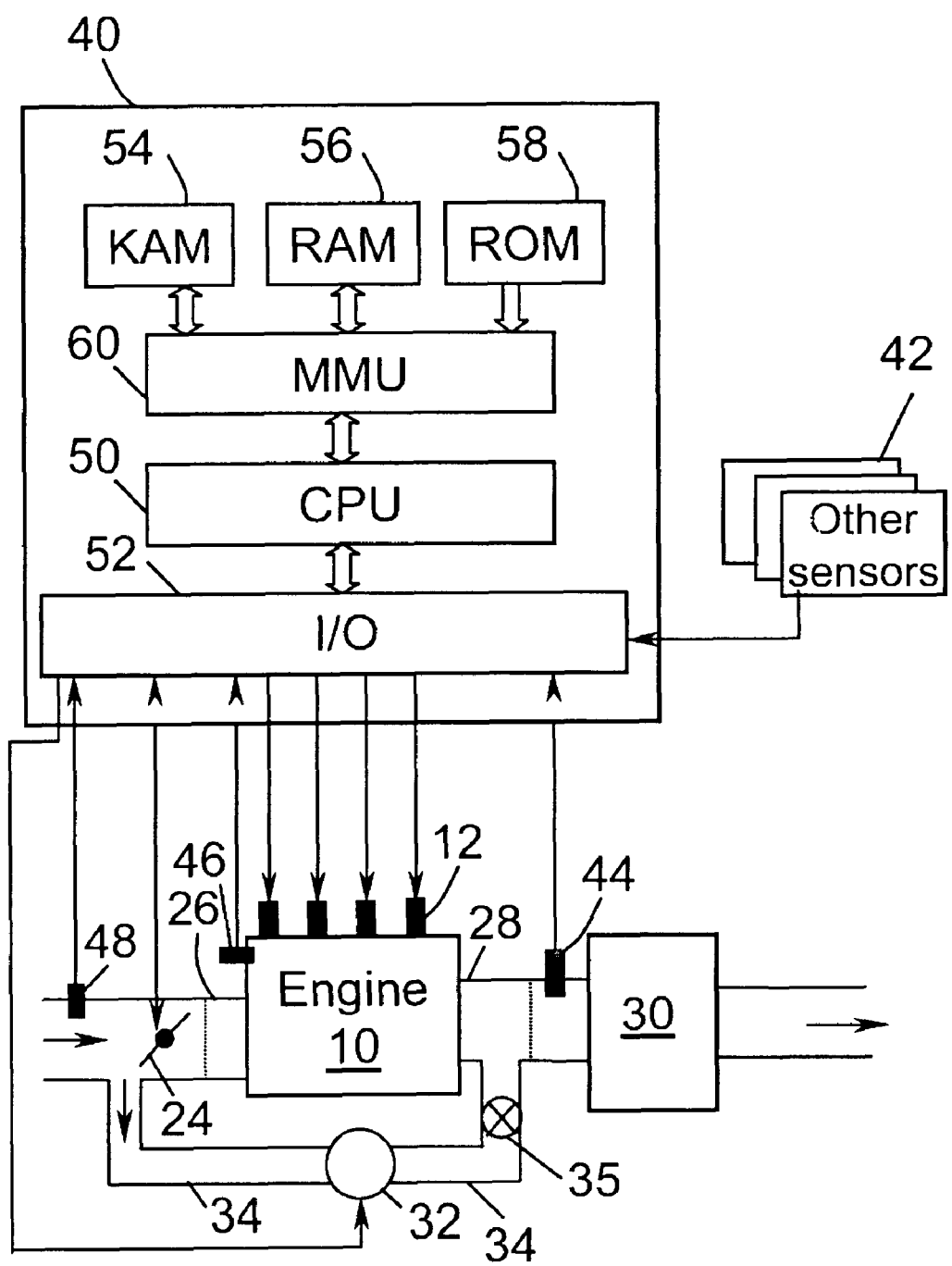
FIG. 1 is a schematic of a multi-cylinder engine.

In FIG. 1 a four-cylinder engine 10 is shown. Intake manifold 26 delivers air to engine 10 and exhaust manifold 28 receives combusted gases from engine 10. Spark plugs 12 are installed in the combustion chambers of engine 10. The present invention also applies to engines, such as diesel and homogenous charge compression ignition, which do not rely on ignition devices. Engine 10 may be equipped with a throttle valve 24, which is used to control air delivered to engine 10. In this particular example shown in FIG. 1, a mass air flow meter 48 is installed in the intake line of the engine. Alternatively, mass air flow rate can be obtained by what is known by those skilled in the art as a speed-density system which computes air flow based on engine speed and intake manifold 26 pressure. Engine 10 is be equipped with a temperature sensor to measure the temperature of the coolant in engine 10, thereby providing an indication of the operating temperature of engine 10. Exhaust aftertreatment device 30 processes exhaust gases from engine 10. An exhaust gas sensor 44 is be installed in the exhaust duct, upstream of exhaust aftertreatment device 30 (as shown) or downstream of exhaust aftertreatment device 30 (alternative not shown). Exhaust gas sensor 44 may be an exhaust gas oxygen sensor, a hydrocarbon sensor, or other exhaust gas component sensor.

In FIG. 1, a secondary air pump 32, as known in the prior art, is shown coupled to engine 10. Air is drawn into pump 32 from the intake duct downstream of air mass flow sensor 48. Alternatively, air is drawn from the atmosphere (not shown). Secondary air flows through duct 34 from the intake duct to the exhaust manifold. Valve 35 is closed when pump 32 is not being operated. To protect pump 32 from possible ill effects by exposure with exhaust gases, valve 35 is closed when pump 32 is not being operated. The present invention does not include elements 32, 34, and 35; instead these indicate hardware used in prior art approaches.

Figure 2:
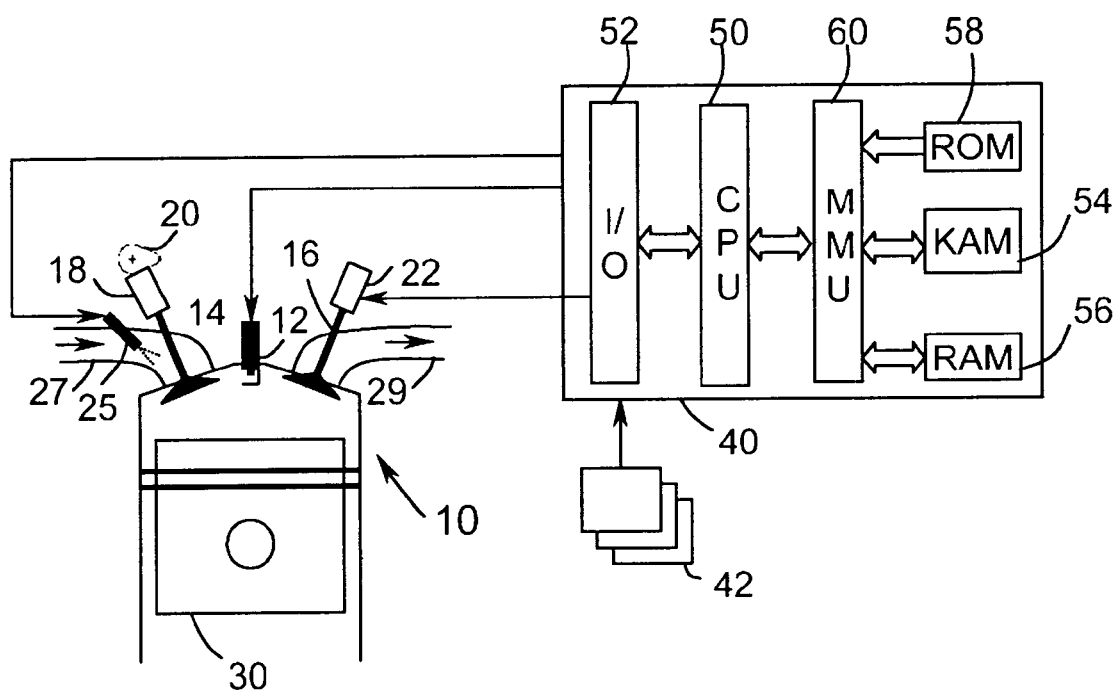
FIG. 2 is a schematic of the valvetrain of a single cylinder of the multi-cylinder engine according to an aspect of the present invention.

Referring now to FIG. 2, a single cylinder of engine 10 is shown. Engine 10 receives air via intake port 27 through intake valve 14. Intake port 27 couples to intake manifold 26 (intake manifold 26 not shown in FIG. 2). Intake valve 14 is actuated by camshaft 20 through tappet 18. Fuel is provided to engine 10 by a fuel injector 25 installed in intake port 27. Alternative fuel metering devices which could be used instead of port fuel injectors 25 are carburetion or central fuel injection. Also, the fuel could be a liquid or gaseous fuel. The fuel and air inducted into the cylinder are ignited by spark plug 12 in a spark ignited engine; alternatively, the fuel and air spontaneously ignite in a compression ignited engine. The products of combustion leave the combustion chamber via exhaust port 29 through exhaust valve 16. Exhaust port 29 couples to exhaust manifold 28 (exhaust manifold 28 not shown in FIG. 2). Exhaust valve 16 is electromagnetically actuated by element 22. The present invention applies to any type of valve configuration for intake valve 14, including, but not limited to, rotary valves, valves actuated by multiple cams (cam switching devices), electromagnetically actuated valves, and electrohydraulically actuated valves. In regards to exhaust valve 16, the present invention applies to valves which can be actuated twice or more for each combustion cycle, which includes, but is not limited to, electromagnetically actuated valves, electrohydraulically actuated valves, and valves actuated by multiple cams. In the latter situation, a cam with multiple lobes would be selected during a period when double pulsing of exhaust valve 16 is desired during warmup of the engine and a cam with a single lobe would be selected otherwise.

The present invention applies to spark-ignited or compression-ignited engines in which the air and fuel are substantially premixed prior to induction into the cylinder, such as port injected, central injected, and carbureted engines providing liquid or gaseous fuels, as mentioned above. The present invention may also be practiced in engines in which the fuel is added directly to the cylinder, such as diesel or direct injection gasoline engines. If the fuel injection hardware, in these direct injection engines, allows multiple fuel pulses to be injected during each engine cycle, fuel can be injected into the cylinder during an expansion stroke of the engine to provide unburned fuel to the exhaust aftertreatment device, as known in the prior art. However, the present invention may be preferred over injecting during the exhaust stroke. For example, some direct injection fuel injection systems do not allow multiple injections per engine cycle, thus not allowing injection during an expansion stroke. Even if expansion stroke injection were allowed by the fuel injection hardware, known problems with in the prior art are wetting the cylinder walls with fuel, which washes off the cylinder's oil layer making the walls susceptible to wear, and fuel dilution of the fuel, thereby diminishing the oil's ability to provide lubrication. These problems could be mitigated by the present invention in which fuel and air are released without relying on an extra injection event during expansion. The present invention may present an additional advantage by releasing fuel and air during the compression stroke because the distribution of fuel in the cylinder might be more desirable than that which exists during an expansion stroke injection thereby providing the desired fuel and air to the exhaust aftertreatment device.

In FIG. 2, a piston 30 is shown disposed in engine 10. Piston 30 reciprocates in a cylinder of engine 10. In four-stroke operation, the processes are: an intake stroke during which piston 30 moves down (away from valves 14 and 16), a compression stroke as piston 30 moves up, an expansion (or power) stroke as piston 30 moves down, and an exhaust stroke as piston 30 moves up. Combustion is typically initiated toward the end of the compression stroke with the majority of combustion occurring during the expansion stroke. Intake and exhaust valves (14 and 16) are closed during most of the compression stroke. In the present invention, exhaust valve 16 opens for a portion of the compression stroke releasing some of the gases (uncombusted fuel and air) from the combustion chamber. The compression process is interrupted during the time that exhaust valve 16 is open and resumes when exhaust valve 16 is closed.

Referring to FIGS. 1 and 2, an electronic control unit (ECU) 40 is provided to control the hybrid camless engine. ECU 40 has a microprocessor 50, called a central processing unit (CPU), in communication with memory management unit (MMU) 60. MMU 60 controls the movement of data among the various computer readable storage media and communicates data to and from CPU 50. The computer readable storage media preferably include volatile and non-volatile storage in read-only memory (ROM) 58, random-access memory (RAM) 56, and keep-alive memory (KAM) 54, for example. KAM 54 may be used to store various operating variables while CPU 50 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 50 in controlling the engine or vehicle into which the engine is mounted. The computer-readable storage media may also include floppy disks, CD-ROMs, hard disks, and the like. CPU 50 communicates with various sensors and actuators via an input/output (I/O) interface 52. Examples of items that are actuated under control by CPU 50, through I/O interface 70, are fuel injection timing, fuel injection rate, fuel injection duration, throttle valve 24 position, timing of spark plug 12 firing, actuation of valve element 22, and others. Sensors 42 communicating input through I/O interface 52 may indicate engine speed, vehicle speed, coolant temperature, manifold pressure, pedal position, throttle valve 24 position, air temperature, exhaust temperature, and mass air flow rate 48. Some ECU 40 architectures do not contain MMU 60. If no MMU 60 is employed, CPU 50 manages data and connects directly to ROM 58, RAM 56, and KAM 54. Of course, the present invention could utilize more than one CPU 50 to provide engine control and ECU 40 may contain multiple ROM 58, RAM 56, and KAM 54 coupled to MMU 60 or CPU 60 depending upon the particular application.

The present invention may be used to rapidly raise temperature in an exhaust aftertreatment device 30 after engine operation has been initiated. It could also be used in situations in which exhaust temperatures are often too low to maintain the operating temperature of exhaust aftertreatment device 30. One such example is in a diesel engine, where due to very lean air-fuel ratios and high thermal efficiencies at which diesels operate, the exhaust temperatures, at many operating conditions, are not high enough to keep the catalyst warm. During such operating conditions with low exhaust temperatures, the present invention may be employed to advantage to provide an exotherm in exhaust aftertreatment device 30. In the case of a diesel engine, the contents in the cylinder are only air and burned gases from prior events until fuel is injected, which typically occurs during the compression stroke. The present invention relates to exhausting both fuel and air from the cylinder to provide the desired exotherm in the aftertreatment device. To provide both fuel and air from a diesel engine, exhaust valve 16 opening may occur after the start of fuel injection. If the fuel injection hardware allows multiple injections, an amount of fuel may be injected in advance of the primary injection event, termed pilot injection by those skilled in the art. Exhausted fuel and air may be used in a diesel engine to provide an exotherm, as described in reference to a spark ignited engine above.

The present invention may also be used in the situation of exhaust aftertreatment devices which provide higher conversion efficiencies in the presence of a reducing agent. In this case, the exhausted fuel, as supplied to the exhaust aftertreatment device according to an aspect of the present invention, may be used to provide fuel as a reducing agent to exhaust aftertreatment devices such as a lean NOx catalyst.

Figure 3:
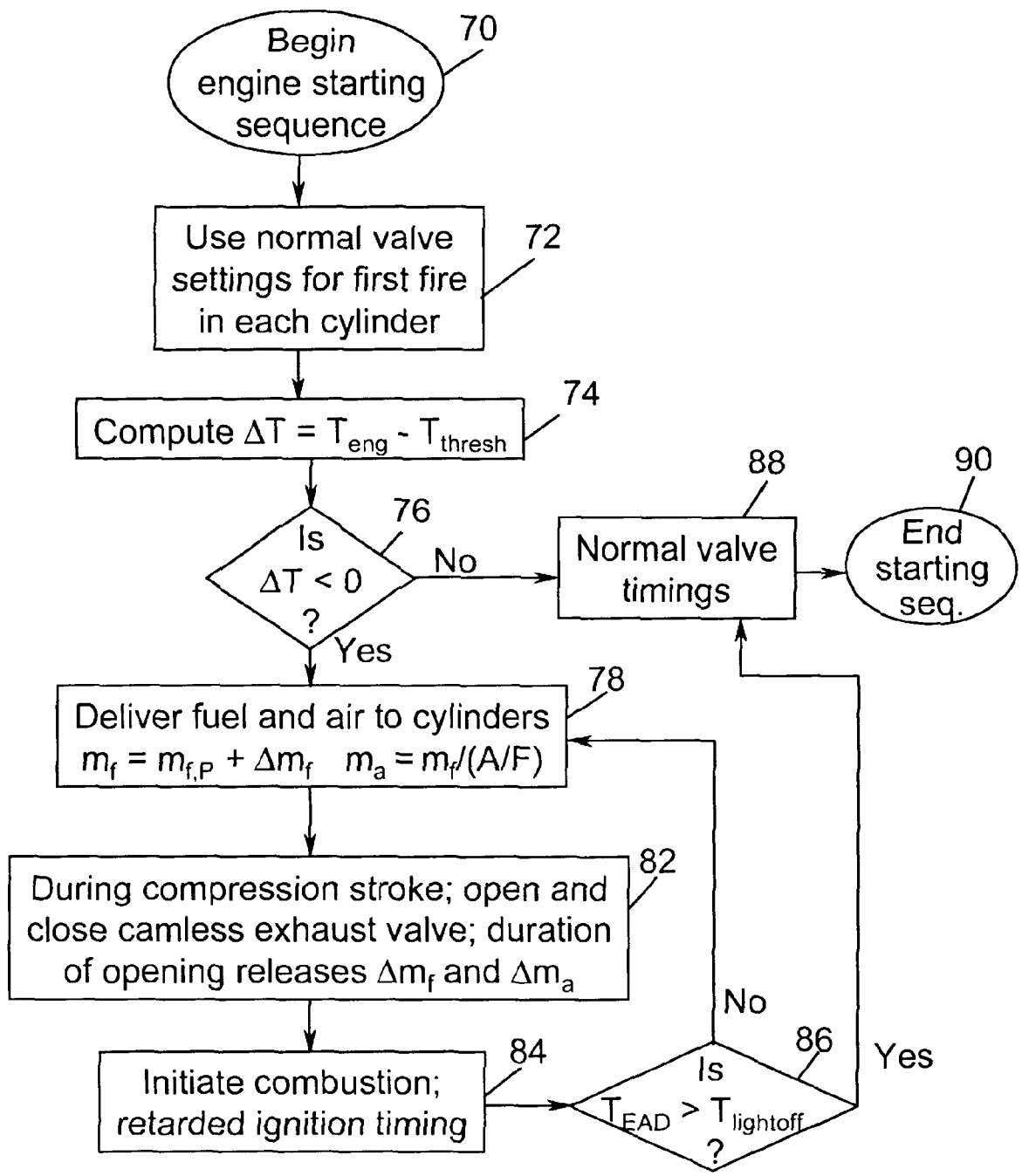
FIG. 3 is a flowchart of a method by which the present invention may be used to advantage.

A starting sequence by which the present invention can be used to advantage is shown in FIG. 3. The engine starts in step 70. Normal valve settings are used for the first fire in each cylinder in step 72. In step 74, $\Delta T$ is computed which is the difference between engine temperature, $T_{eng}$, and a threshold temperature, $T_{thresh}$. $T_{thresh}$ indicates that temperature is high enough in the exhaust aftertreatment so that there is no need to provide an exotherm. An example of such an occurrence is a restart of the engine before it has cooled down from previous operation. $T_{eng}$ may be an engine coolant temperature, an engine metal temperature, an exhaust temperature, an exhaust aftertreatment temperature, a combination of the above temperatures, or a model in ECU 40 of temperature which may be based on any of the above temperatures. In block 76, if $\Delta T$ is greater than 0, control passes to step 88 and normal valve timings are used. Control then passes to step 90 in which the starting sequence is ended. If in step 76, $\Delta T$ is less than 0, control passes to step 78 in which the fuel and air is delivered to the cylinders. The amount of fuel to deliver to the cylinder, $m_f$, has two components: $m_{f,P}$, the amount of fuel to provide the desired torque, and $\Delta m_a$, the amount of fuel which will be released into the exhaust system to provide an exotherm in the exhaust aftertreatment device 30. The amount of air to deliver to the combustion chamber, $m_a$, can be computed similarly as the computation for fuel. Or, as shown in step 78, $m_a$ may be computed based on the desired air-fuel ratio, AF, and $m_f$ already computed. Control passes to step 82 in which opening and closing times of exhaust valve 16 are determined and exhaust valve 16 are actuated such that the $\Delta m_f$ and $\Delta m_a$ are released. Control passes to step 84 in which combustion is initiated. The spark timing may be retarded to further assist heating exhaust aftertreatment device 30. Control passes to step 86 in which it is determined whether the temperature of the exhaust aftertreatment device, $T_{EAD}$, is greater than the lightoff temperature of the catalyst, $T_{lightoff}$. If step 86 yields a positive result, control passes to step 88 in which normal valve timings are adopted. Otherwise, control passes to step 78 in which the method of the present invention is continued until a negative result occurs in step 86. As described above, control continues to step 88 and finishes in step 90.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

What is claimed is:

1. A method for operating a multi-cylinder internal combustion engine, each cylinder is coupled to an exhaust aftertreatment device via an exhaust valve capable of actuation during a compression stroke of the cylinder, comprising the steps of:
   providing a predetermined amount of air and a predetermined amount of fuel into one of the cylinders of the engine;
   compressing said air and said fuel during the compression stroke of the cylinder; and
   opening the exhaust valve prior to ignition of said air and said fuel and during said compressing step, said exhaust valve opening releasing a portion of said air and a portion of said fuel into the exhaust aftertreatment device to raise its temperature.

2. The method of claim 1 wherein said air and said fuel are substantially mixed prior to said providing step.

3. The method of claim 1 wherein said predetermined amount of fuel is provided into an intake port coupled to said cylinder by a fuel injector disposed in said intake port.

4. The method of claim 1, further comprising the step of closing the exhaust valve prior to igniting a part of said air and said fuel.

5. The method of claim 4, further comprising the steps of:
   determining a retained amount of said fuel and a retained amount of said air to retain in the cylinder to provide a desired engine torque;
   determining a desired temperature rise in the exhaust aftertreatment device; and
   determining a released amount of said fuel and a released amount of said air to release into the exhaust aftertreatment device to provide said desired temperature rise.

6. The method of claim 5, said predetermined amount of fuel is based on said retained amount of fuel and said released amount of fuel.

7. The method of claim 5, further comprising the step of determining a timing of said opening and a timing of said closing of said exhaust valve to release said released amount of air and said released amount of fuel from the cylinder into the exhaust aftertreatment device.

8. A method for operating a multi-cylinder internal combustion engine, each cylinder is coupled to an exhaust aftertreatment device via an exhaust valve capable of actuation during a compression stroke of the cylinder, comprising the steps of:

provide a predetermined amount of a mixture of fuel and air into a cylinder of the engine;

compressing said mixture;

opening the exhaust valve during said compressing step, said exhaust valve opening releases a portion of said mixture into the exhaust aftertreatment device to raise its temperature; and closing the exhaust valve after said opening step and prior to igniting a retained mixture, said retained mixture is said predetermined amount of said mixture less said released portion of said mixture.

9. The method of claim 8 wherein said mixture of fuel and air is in substantially stoichiometric proportion.

10. The method of claim 9 wherein said ignition is initiated by firing a spark plug disposed in the cylinder.

11. The method of claim 8 wherein said ignition occurs spontaneously as a result of said compressing step.

12. The method of claim 8 wherein timing of said opening and timing of said closing are determined based on a desired amount of said mixture of fuel and air to be released in the exhaust aftertreatment device.

13. A system for providing fuel and air to an exhaust aftertreatment device coupled to a reciprocating multi-cylinder internal combustion engine, comprising:

an exhaust valve coupled to a cylinder of the engine which is capable of being actuated during a compression stroke of the cylinder;

an engine controller operably connected to the engine and said exhaust valve to actuate said exhaust valve during said compression stroke thereby releasing a portion of the contents of said cylinder into the exhaust aftertreatment device; and an intake valve coupled to said cylinder, wherein said actuation of said exhaust valve occurs after said intake valve is closed and before the contents of said cylinder are ignited.

14. A computer readable storage medium having stored data representing instructions executable by a computer to control a multi-cylinder internal combustion engine, each cylinder has at least one intake valve, at least one exhaust valve and a piston disposed therein, each cylinder is coupled to an exhaust aftertreatment device via the exhaust valve, comprising:

instructions to determine a retained amount of air and fuel to trap in one of the cylinders; and instructions to determine a bypass amount of air and fuel to release from the cylinder into the exhaust aftertreatment device, said release occurs during a compression stroke, said compression stroke comprises an upward movement of the piston while the intake and the exhaust valves are closed.

15. The storage medium of claim 14, further comprising instructions to determine an inducted amount of air and fuel to induct into the cylinder wherein said inducted amount of air and fuel is based on said retained amount of air and fuel and said bypass amount of air and fuel.

16. The storage medium of claim 15, further comprising instructions to actuate the exhaust valve during said compression stroke to release said bypass amount of air and fuel from the cylinder.

17. The storage medium of claim 14 wherein said retained amount of air and fuel is an amount which when combusted in the cylinder provides a desired engine torque.

* * * * *